United States Patent Office 3,423,486
Patented Jan. 21, 1969

3,423,486
OXYALKYLATED 2,2-BIS(CHLOROMETHYL)-1,3-PROPANEDIOL-BIS-PHOSPHATE
Rudi F. W. Rätz, Hamden, and Arthur D. Bliss, Guilford, Conn., assignors to Olin Mathieson Chemical Corporation, a corporation of Virginia
No Drawing. Filed May 3, 1966, Ser. No. 547,164
U.S. Cl. 260—928          2 Claims
Int. Cl. C07f 9/08; C08g 22/44

This invention relates to phosphorus and chlorine containing polyols and to polyurethane foams prepared from these polyols. More specifically, it relates to compounds having the following general formula:

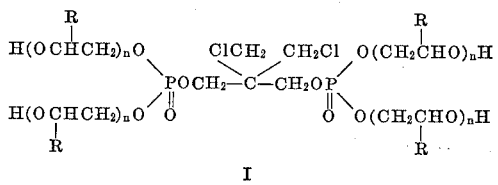

where R is hydrogen, alkyl, chloromethyl, aryl, 1,1,1-trichloroethyl, or hydroxymethyl, and $n$ is an integer from 1 to 4 inclusive.

It has been found that polyols having the Formula I are provided by the reaction of 2,2-bis(chloromethyl)-1,3-propanediol-bis-phosphate (II), otherwise known as 4,4-bis(chloromethyl)-1,1,7,7-tetrahydroxy-2,6-dioxa-1,7-diphosphaheptane-1,7-dioxide with appropriate oxiranes in accordance with the following equation, where R is as previously defined:

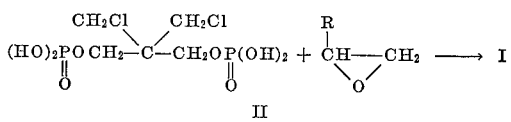

The tetraacid having the Formula II is conveniently provided by the hydrolysis of 4,4-bis(chloromethyl)-1,1,7,7-tetrachloro-2,6-dioxa-1,7-diphosphaheptane - 1,7 - dioxide. The latter compound and its preparation has been described in the art, for example, in French Patent No. 1,349,087.

A wide variety of oxiranes can be employed in the reaction with the tetraacid in accordance with this invention. Preferred embodiments include alkylene oxides having from 2–4 carbon atoms. Illustrative of such compounds are ethylene oxide, propylene oxide, butylene oxide and trichlorobutylene oxide. Other preferred oxiranes such as styrene oxide, glycidol, epichlorohydrin and the like may also be utilized in the reaction with the tetraacid. These preferred oxiranes provide compounds having the Formula I where R is hydrogen, methyl, ethyl, chloromethyl, phenyl, 1,1,1-trichloroethyl or hydroxymethyl and $n$ is an integer from 1 to 4 inclusive.

In the practice of the invention, 2,2-bis(chloromethyl)-1,3-propanediol-bis-phosphate is reacted with an oxirane at a temperature range of about 20°–140° C. to provide polyols having the Formula I. No catalyst is required in this process. While the reaction proceeds without the use of a solvent, one can be advantageously employed if so desired. Suitable solvents include an excess of the oxirane; anhydrous dioxane; an aromatic hydrocarbon such as benzene, toluene or xylene; and the like. The reactants may be utilized in a mole ratio of tetraacid to oxirane in the range between about 1:4 and about 1:8, and preferably between about 1:6 and about 1:7. The integer $n$ in the product (I) may be varied by reacting an excess of oxirane with the tetraacid.

The compounds of this invention are particularly useful as components in polyester and polyurethane compositions. For example, polyurethane foams may be prepared by reacting a polyol having the Formula I, or a blend thereof with another polyol, with an organic isocyanate in the presence of a foaming agent and a reaction catalyst. Polyols suitable for blending with polyol I include oxyalkylated glycerol; oxyalkylated pentaerythritol; the reaction product of propylene oxide, starch and glycerol; oxyalkylated trimethylol propane and the like. The blend of polyol I with the aforementioned polyols may comprise from about 30 percent to 99 percent of polyol I, with about 40 percent to 60 percent of polyol I being employed in the preferred blends.

Any organic polyisocyanate may be employed in the preparation of the polyurethane foams. This includes diisocyanates, triisocyanates, and polyisocyanates. Illustrative of these isocyanates are the following: toluene diisocyanate, which is a mixture of 80 percent by weight of 2,4-tolylene diisocyanate and 20 percent of the 2,6-isomer: methylene-bis-(4-phenyl isocyanate); polyphenylene polymethylene isocyanate; 3,3' - bitolylene-4,4'-diisocyanate; 3,3' - dimethoxy-4,4'-biphenylene diisocyanate; naphthalene-1,5-diisocyanate; hexamethylene diisocyanate; 1,4-phenylene diisocyanate; and the like.

The amount of isocyanate employed in the preparation of the polyurethane foams should be sufficient to provide at least 0.7 NCO group based on the number of hydroxyl groups present in the reaction system. This includes the number of hydroxyl groups present in the polyol, the number of hydroxyl groups in any additive employed and the number of hydroxyl groups in the foaming agent. An excess of isocyanate compound may be conveniently employed; however, this is generally undesirable due to the high cost of the isocyanate compounds. It is preferable, therefore, to employ no greater than about 1.5 NCO groups based on the number of hydroxyl groups and preferably between about 0.9 and 1.1 NCO groups.

The polyurethane foams are prepared in the presence of a foaming agent, reaction catalyst, and, optionally, a small proportion of a surfactant. The foaming agent employed may be any of those known to be useful for this purpose, such as water, the halogenated hydrocarbons, and mixtures thereof. Typical halogenated hydrocarbons include, but are not limited to, the following: trichlorofluoromethane, difluorodichloromethane, 1,1,2-trichloro-1,2,2-trifluoroethane, methylene chloride, chloroform, and carbon tetrachloride. The amount of foaming agent employed may be varied within a wide range. Generally, however, the halogenated hydrocarbons are employed in an amount from 1 to 50 parts by weight per 100 parts by weight of the polyol and generally water is employed in an amount of from 0.1 to 10 parts by weight per 100 parts by weight of the polyol.

The polyurethane foams are prepared in the presence of a catalytic amount of a reaction catalyst. The catalyst employed may be any of the catalysts known to be useful for this purpose. Typical catalysts include, but are not limited to, the following: amines such as N,N,N',N'-tetramethylbutylenediamine-1,3-N-methyl morpholine, N-hydroxyethyl morpholine, triethylene diamine, triethylamine and trimethylamine; and metallic salts, for example, the salts of antimony, tin and iron, such as dibutyltin dilaurate and stannous octoate. Generally speaking, the catalyst is employed in an amount from 0.1 to 15.0 percent by weight based on the polyol.

Various additives may be employed in the preparation of the foams in order to achieve particular properties. For example, minor amounts of a surfactant, such as a soap; fillers, such as clay, calcium sulfate, or ammonium phosphate; dyes; plasticizers; and the like may be incorporated into the foam.

Since the polyols I have a high halogen and phosphorus content, foams prepared from these polyols likewise have high halogen and phosphorus contents and are therefore remarkably flame-retardant.

The following examples will serve to illustrate the preparation of the compounds of this invention. Example 1 is directed to the preparation of the tetraacid intermediate, Examples 2 to 7 are illustrative of the preparation of compounds having the Formula I, and Example 8 illustrates the method of preparing a foam from a polyol (I).

Example 1

To 650 ml. of water cooled to 6°–7° C. by means of an ice bath was added dropwise, with stirring, 300 g. (0.73 mole) of 4,4 - bis(chloromethyl) - 1,1,7,7, - tetrachloro - 2,6-dioxa-1,7-diphosphaheptane-1,7-dioxide. The addition required three hours for completion. At this time, a small amount of undissolved yellow gum was observed in the reaction flask. The solution was treated with charcoal and filtered by gravity. The filtrate was evaporated in a current of air. During the evaporation step, a white solid separated from the liquid. This solid material was then dried for two days in vacuum over phosphorus pentoxide, pulverized in a mortar and dried for one additional day in vacuum.

The product weighed 224 g., representing a 91 percent yield. A melting point of 190°–192° C. was determined using Fisher-Johns aparatus. No precipitate was detected when the product was treated with aqueous silver nitrate, indicating the absence of hydrolyzable chlorine. The following analytical data revealed that 2,2-bis(chloromethyl) - 1,3 - propanediol-bis-phosphate (II) had been obtained:

*Analysis.*—Calc'd for (II): Neutralization equivalent 83.3 g. II/mole base. Found: Neutralization equivalent 82.3 g. II/mole base. Calc'd for $C_5H_{12}Cl_2O_8P_2$: C, 18.00; H, 3.63; Cl, 21.29; P, 18.60. Found: C, 17.52; H, 3.91; Cl, 20.92; P, 18.70 $pKa_1$ 2.60; $pKa_2$ 7.0 (26°, water).

Example 2

To a stirred solution of 300 g. (0.9 mole) of (II) in 1400 ml. of dioxane, maintained at 50° C. by means of an oil bath, was added over a period of 1.5 hours 320 g. (5.5 moles) of propylene oxide. After stirring for 2 additional hours, the solution was acidic when tested with Hydrion paper. It was allowed to stand overnight at room temperature and then heated to 65° C. and charged with an additional 50 g. (0.86 mole) of propylene oxide. After 2 hours, the solution had become neutral. It was cooled and filtered by gravity. Dioxane and excess propylene oxide were removed by evaporation at reduced pressure. Residual dioxane was then removed by heating the solution for 3 hours at 100° C. under 0.1 mm. of mercury pressure. The resulting viscous yellow oil was dissolved in twice its volume of anhydrous ethanol, treated with decolorizing carbon, filtered, and again evaporated at a reduced pressure to yield 494.6 g. of slightly yellow, viscous liquid. A yield of 97 percent was determined. The following analytical data showed that tetrakis(hydroxypropyl) - 2,2 - bis(chloromethyl)-1,3-propanediol-bis-phosphate had been obtained:

*Analysis.*—Calc'd for $C_{17}H_{36}Cl_2O_{12}P_2$: Hydroxyl No. 400 mg. KOH/g. Found: Hydroxyl No. 397 mg. KOH/g. (corrected for residual acidity).

Examples 3–7

Examples 3–7 were conducted in accordance with the procedure described in Example 2, but varying reaction conditions such as temperature and solvent. In this manner, additional moles of propylene oxide were reacted with the tetraacid to provide polyols of the Formula I where $n$ is >1. The following table lists the reaction conditions, wherein the number of moles of propylene oxide reacted per mole of tetraacid was determined from the weight of the final, neutralized product.

TABLE I

| Example | Reaction temperature (° C.) | Solvent | PO/Tetraacid ratio in polyol product |
| --- | --- | --- | --- |
| 3 | Room | None | 3.1 |
| 4 | do. | Toluene | 8.0 |
| 5 | do. | Dioxane | 7.6 |
| 6 | 100–130 | Xylene | 6.0 |
| 7 | 90 | Dioxane | 4.6 |

Example 8

Tetrakis (hydroxypropyl) - 2,2 - bis(chloromethyl) - 1,3-propanediol-bis-phosphate (50 parts), which is a compound included in the Formula I where R is methyl and $n$ is 1, was blended with 50 parts of an oxypropylated glycerol/starch polyether prepared in accordance with the process disclosed in pending application Ser. No. 443,098, wherein a 1:4 mole ratio of glycerol to starch is employed. N,N,N',N'-tetramethylbutylenediamine-1,3 (5.5 parts), silicone oil (2 parts), and trichlorofluoromethane (32.5 parts) were added to the polyol blend and the mixture was stirred until homogeneous. Then 96 parts of polyphenylene polymethylene isocyanate was added. The resulting mixture was stirred for a few seconds, and then poured into a rectangular box. Creaming of the mixture was observed 20 seconds after the addition of the polyisocyanate. In 70 seconds the rise of the foam was complete, and a tack-free foam was obtained in 85 seconds. The resulting rigid foam had excellent physical properties and was non-burning when subjected to a flame from a propane torch for 8–9 minutes in accordance with the method prescribed in the SPI Proposed Tentative Test Method for Flame Penertation Test, Draft 2.

We claim:

1. Compounds having the following formula:

$$\begin{array}{cc} R & ClCH_2CH_2Cl \\ | & \\ H(OCHCH_2)_nO & \diagdown \quad \diagup \\ & POCH_2-C-CH_2OP \\ H(OCHCH_2)_nO & \diagup \; || \quad | \; \diagdown \\ | & O \\ R & \end{array} \begin{array}{c} R \\ | \\ )(CH_2CHO)_nH \\ \\ )O(CH_2CHO)_nH \\ | \\ R \end{array}$$

where R is hydrogen, methyl, ethyl, chloromethyl, phenyl, 1,1,1-trichloroethyl, or hydroxymethyl and $n$ is an integer from 1 to 4 inclusive.

2. The compound of claim 1 having the name tetrakis-(hydroxypropyl) - 2,2 - bis(chloromethyl) - 1,3-propanediol-bis-phosphate.

References Cited

UNITED STATES PATENTS 3,192,242   6/1965   Birum _____ 260—928

CHARLES B. PARKER, *Primary Examiner.*

ANTON H. SUTTO, *Assistant Examiner.*

U.S. Cl. X.R.

260—2.5, 75, 977, 983